United States Patent
Wu

(10) Patent No.: US 10,713,086 B2
(45) Date of Patent: Jul. 14, 2020

(54) ASYNCHRONOUS DIRECTED ACYCLIC MAP BASED DISTRIBUTED TRANSACTION NETWORK

(71) Applicant: Zhongwei Wu, Hastings On Hudson, NY (US)

(72) Inventor: Zhongwei Wu, Hastings On Hudson, NY (US)

( * ) Notice: Subject to any disclaimer, the term of this patent is extended or adjusted under 35 U.S.C. 154(b) by 178 days.

(21) Appl. No.: 16/120,732

(22) Filed: Sep. 4, 2018

(65) Prior Publication Data

US 2020/0073698 A1    Mar. 5, 2020

(51) Int. Cl.
G06F 9/46       (2006.01)
H04L 9/06       (2006.01)
G06F 16/23      (2019.01)

(52) U.S. Cl.
CPC .......... *G06F 9/466* (2013.01); *G06F 16/2365* (2019.01); *G06F 16/2379* (2019.01); *H04L 9/0637* (2013.01)

(58) Field of Classification Search
None
See application file for complete search history.

(56) References Cited

U.S. PATENT DOCUMENTS

| 9,608,829 | B2 | 3/2017 | Spanos et al. |
| 2008/0222415 | A1 | 9/2008 | Munger et al. |
| 2010/0111298 | A1 | 5/2010 | Krig |
| 2015/0341167 | A1 | 11/2015 | Gregory et al. |
| 2017/0180469 | A1 | 6/2017 | Ford et al. |
| 2017/0264428 | A1 | 9/2017 | Seger, II |
| 2017/0301047 | A1* | 10/2017 | Brown ............... G06Q 20/3827 |

(Continued)

OTHER PUBLICATIONS

Vitalik Buterin; Ethereum White Paper, A Next Generation Smart Contract & Decentralized Application Platform; Paper; 2014; 36 pages; URL: http://www.the-blockchain.com/docs/Ethereum_white_paper-a_next_generation_smart_contract_and_decentralized_application_platform-vitalik-buterin.pdf.

(Continued)

*Primary Examiner* — Amresh Singh
(74) *Attorney, Agent, or Firm* — Goldstein Law Offices, P.C.

(57) ABSTRACT

A distributed transaction network for processing and verifying transactions asynchronously between transaction parties comprising a transferor and a transferee, the transferor having an obligation to transfer control of assets to the transferee. Each transaction party is randomly assigned a verifier upon it joining the network, which verifies the transaction of its transaction party by ensuring the asset of the transferor satisfies the transaction obligation and no fork condition exists. The transaction is executed only upon every verifier verifying and signing the transaction. The distributed transaction network further has a directed acyclic transaction map comprising topologically sorted transactions forming a single transaction path of sequentially executed transactions for each transaction party, to prevent the occurrence of race conditions, double spend, or fork conditions. The transaction network further comprises a global consensus mechanism to detect and replace failing verifiers and reverse invalid transactions which were improperly signed by the failing verifiers.

19 Claims, 11 Drawing Sheets

(56) References Cited

U.S. PATENT DOCUMENTS

2017/0310653 A1 10/2017 Zhang

OTHER PUBLICATIONS

Satoshi Nakamoto; Bitcoin: A Peer-to-Peer Electronic Cash System; Paper; 2008; 9 pages; URL: https:/bitcoin.org/bitcoin.pdf.
Serguei Popov; The Tangle; Paper; Apr. 30, 2018; 28 pages; Version 1.4.3; URL: https://iota.org/IOTA_Whitepaper.pdf.
Vitalik Buterin and Virgil Griffith; Casper the Friendly Finality Gadget; Paper; 2017; 11 pages; Ethereum Foundation; URL: https://github.com/ethereum/research/blob/master/papers/casper-basics/casper_basics.pdf.

* cited by examiner

ASYNCHRONOUS DIRECTED ACYCLIC MAP BASED DISTRIBUTED TRANSACTION NETWORK

TECHNICAL FIELD

The present disclosure relates generally to a system for executing transactions for transferring digital assets between transaction parties. More particularly, the present disclosure relates to a distributed transaction network adapted to asynchronously execute secure transactions.

BACKGROUND

Blockchain technology is becoming increasingly widespread due to its ability to provide transaction systems which are distributed, trustless, and capable of executing transactions in a transparent manner and establishing an unalterable record of all executed transactions. However, blockchain technology suffers from problems stemming from its fundamental design which cause poor performance, high latency, and high transaction costs, thereby severely limiting the scalability of the technology.

In a conventional blockchain network, transactions are written to new blocks which must be verified by every full node participating in the network through a chain of blocks which synchronizes all transactions sequentially. Therefore, the performance of the network, as defined by the number of transactions that the network can process during a set time interval, is strictly limited by the combination of the block size and the block creation time interval that enforces a global consensus on all transactions. Every full node must also maintain a complete copy of the continually expanding distributed ledger which records all transactions processed by the blockchain network. Furthermore, in proof-of-work blockchain networks, nodes are engaged in a resource intensive race to mine new blocks to add to the blockchain by means of solving a cryptographic puzzle which increases in difficulty as more blocks are added to the blockchain. This growing storage and computation requirement, combined with the ever-increasing processing power needed to generate new blocks, poses a significant barrier to participation by average users, which undermines the distributed and decentralized nature of the blockchain as fewer and fewer nodes are able to meet the processing and data storage requirements. Thus in addition to limiting scalability, this also degrades the security offered by a decentralized network as processing power is increasingly concentrated among a shrinking number of sufficiently powerful individual nodes or centrally controlled mining pools.

Certain alternative networks within the prior art seek to address the lack of scalability and performance penalties which characterize conventional blockchain networks. One prior art transaction network relies on a peer-to-peer network which dispenses with a blockchain consensus and verification and instead requires every participant making a transaction to verify two preceding transactions within a data structure organized as a chain of transactions before each transaction can be processed, theoretically creating a chain of honest transactions. However, this approach does not fully prevent double-spend attacks or race conditions whereby assets are accessed simultaneously across multiple transactions, nor does it employ robust verification of each transaction to prevent dishonest participants from overwhelming honest participants during a lull in transaction activity by honest participants. Other networks exist which instead depend on trusted parties acting as "notaries" or "delegates" to verify transactions, thereby creating a centralized network which completely abandons the benefits of a trustless, decentralized network.

A need therefore exists for a truly decentralized distributed transaction network capable of executing secure transactions while overcoming the deficiencies in scalability and performance of prior art blockchain networks while also avoiding the disadvantages of decreased security and increased centralization of alternative transaction networks found within the prior art.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a distributed network capable of securely executing a transaction involving the transfer of digital assets between transaction parties. Typically, each transaction has a transaction obligation, whereby one of the transaction parties is a transferor obligated to transfer control of an asset to one of the transaction parties as a transferee. Accordingly, the present disclosure provides a distributed transaction network adapted to randomly select and assign a verifier to each transaction party (called the client) involved in all its transactions from amongst a plurality of verifier nodes. Each verifier verifies the transaction by ensuring the digital assets (or the state) of its transaction party satisfy the transaction obligation, and executes all of that particular party's transactions strictly sequentially. The random selection and assignment of the verifiers to the transaction parties prevents collusion between the verifiers and the transaction parties. The present embodiment also uses the word node to refer to parties or transaction parties on the distribution transaction network interchangeably.

Another aspect of an example embodiment in the present disclosure is to provide a distributed network capable of executing transactions securely and asynchronously in parallel, without the need for the execution of each transaction to be delayed for verification and selection by a mining node in the entire distributed blockchain network before it is included in the next block in a global consensus mechanism. Accordingly, the present disclosure provides a distributed transaction network where each transaction is executed asynchronously promptly upon being approved and signed by all related transaction parties and their verifiers. This requires each transaction to be digitally signed by each transaction party, and to be verified and signed by each verifier assigned to each transaction party. The signed transaction is then broadcast to the entire network so any node can keep a copy of all transactions if they choose to do so. However, transactions do not need mining nodes to select and include them in a block to be confirmed, thus avoiding the expensive global consensus in blockchains, resulting in immediate confirmation and the avoidance of mining operations for each transaction confirmation.

Yet another aspect of an example embodiment in the present disclosure is to provide a distributed network capable of preventing the occurrence of race conditions, forks, or double spend attempts. Accordingly, the present disclosure provides a distributed transaction network adapted to generate an asynchronous distributed acyclic transaction map comprising a plurality of topologically sorted vertices each representing one transaction, whereby all the transactions of each transaction party form a single transaction path of a sequence of interconnected transactions connecting the most recent transaction of the transaction party to the earliest transaction of the same transaction party, ensuring that each transaction of the same transaction party is executed sequentially and that the assets of the transferor are accessible for only one transaction at a time.

It is yet another aspect of an example embodiment in the present disclosure to provide a distributed network adapted to incentivize participation by verifiers to increase the processing power and reliability of the network. Accordingly, the present disclosure provides a distributed transaction network whereby each verifier is entitled to collect a fee for each verified transaction, and is further required to submit a stake which is forfeited upon the verifier improperly verifying an invalid transaction, or causing a fork in its transaction party's sequence of transactions.

It is a further aspect of an example embodiment in the present disclosure to provide a distributed network which is protected against the failure of verifiers or attacks from malicious nodes acting as verifiers. Accordingly, the distributed transaction network further comprises a plurality of nodes adapted to generate and maintain a global consensus mechanism adapted to store the assignment of each verifier to each transaction party, but not the transaction data itself. The global consensus mechanism is generally maintained by the plurality of nodes, and allow the nodes to perform actions via the global consensus mechanism only to assign and reassign verifiers, reverse invalid transactions and confiscate the stakes of failing verifiers that have verified invalid transactions or forks. Such a global consensus mechanism can use a proof-of-work blockchain with a plurality of mining nodes. Each completed transaction is broadcast to all nodes on the network and can be checked by the distributed transaction network, and the distributed transaction network is adapted to reverse improperly verified transactions. However, such checks are voluntary and do not impede or delay transaction occurrences and confirmations.

The present disclosure addresses at least one of the foregoing disadvantages of blockchains—in particular the lack of scalability inherent in the examples found within the prior art. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1A:
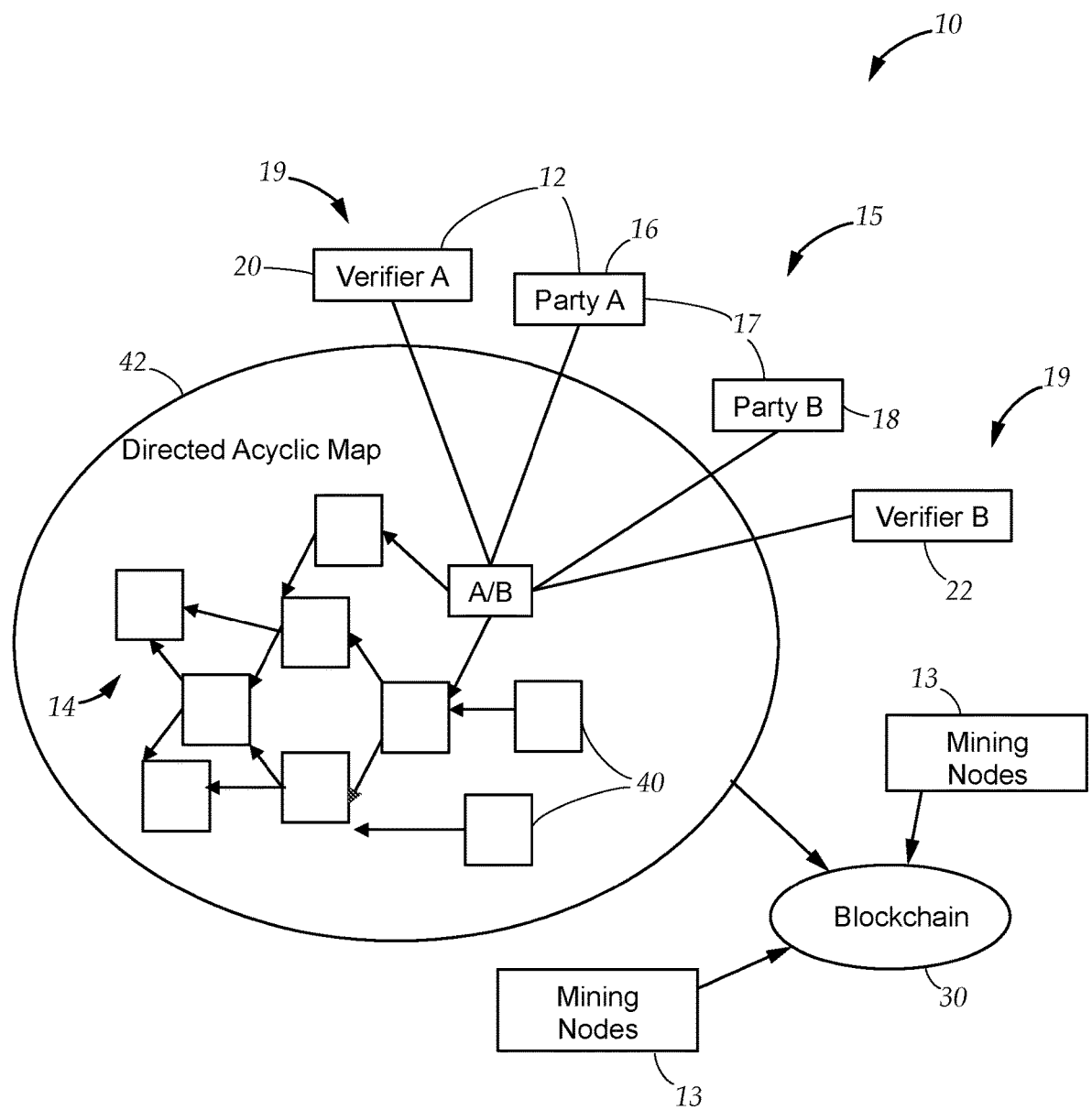
FIG. 1A is block diagram depicting an asynchronous distributed transaction network comprising a plurality of interconnected nodes comprising verifier nodes, non-verifier nodes, and all other nodes in accordance with an embodiment of the present disclosure.
Figure 1B:
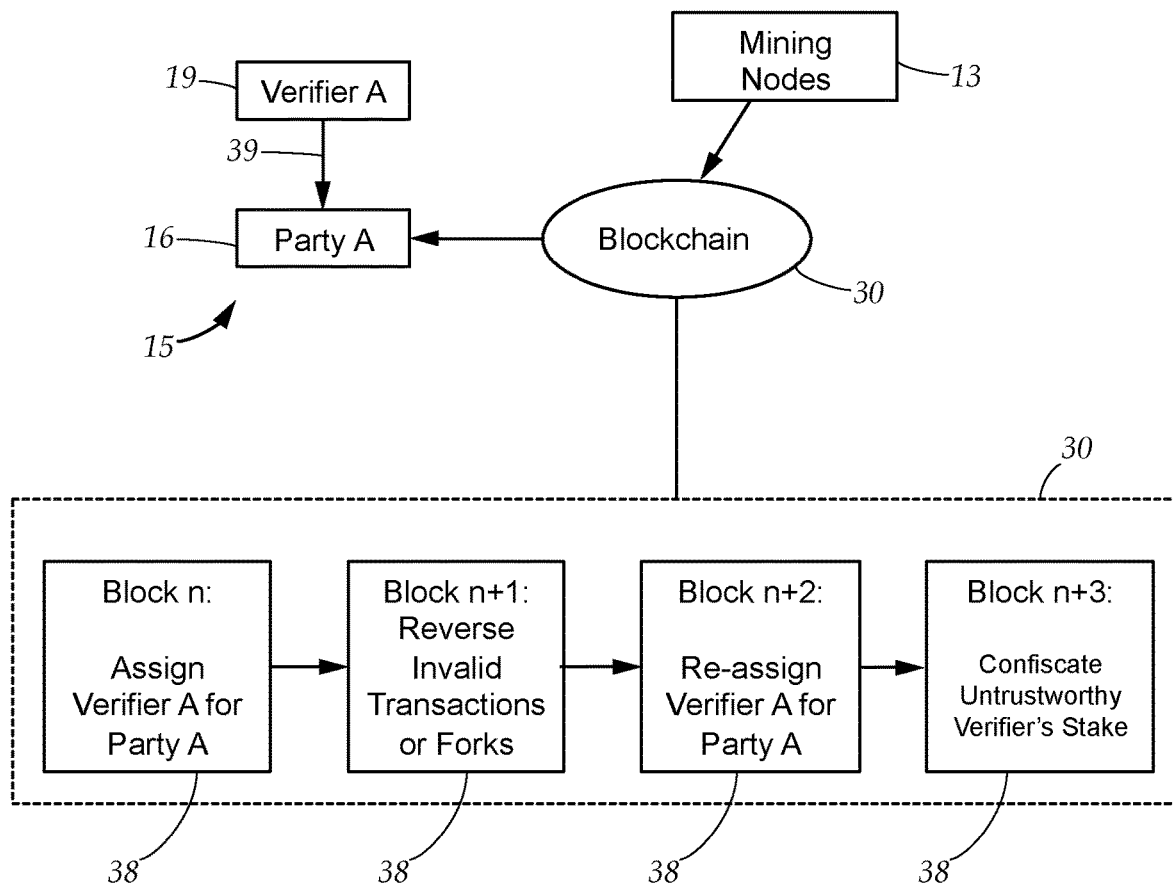
FIG. 1B is a block diagram depicting the interaction between the distributed transaction network and the global consensus mechanism blockchain, in accordance with an embodiment of the present disclosure.

In the descriptions of the preferred embodiments below, generally square boxes represent data structures, including either a transaction 40 (as shown in FIG. 1A), or a block 38 in a blockchain (as shown in FIG. 1B). The oval represents an aggregation of such data structures, such as an aggregation of digital transactions that constitute an asynchronous directed acyclic transaction map 14, or an aggregation of blocks that constitute a blockchain 30. Generally, rectangular boxes represent nodes 12 that constitute computing resources that represent an entity in the real world that may own digital assets, engage in transactions on the network, or perform certain functions on the network for other nodes such as verification.

FIG. 1A illustrates an asynchronous distributed transaction network 10 for verifying and completing transactions 40 between transaction parties 15, comprising a plurality of nodes 12 which are interconnected via a network such as the Internet. Each node 12 is a computing device, and may be a verifier node 19 or a non-verifier node 17. Any node 12 may act as a user node which allows it to access the distributed transaction network 10 and participate as a transaction party 15, while the verifier nodes 19 are adapted to perform additional distributed computing operations over the distributed transaction network 10 as well as form a distributed data store of all transactions. Furthermore, transaction parties are not limited to users, and any node 12 may participate as a transaction party 15. Each transaction 40 is contained in a network of transactions 42 which is in turn stored using the distributed data store. The distributed transaction network 10 further comprises an asynchronous directed acyclic transaction map 14 which is a data structure generated using the network of transactions 42, which is collectively maintained by the verifier nodes 19. Upon joining the distributed transaction network 10, each node 12 is assigned a verifier which is randomly selected from amongst the verifier nodes 19. The node 12 to which the verifier is assigned is referred to as a client node 17. Each node 12 may (but is not required to) store a complete copy of the asynchronous directed acyclic transaction map 14, and is eligible for assignment by the distributed transaction network 10 to its client node 17. More specifically, the verifier node 19 for a user node maintains the entire transaction history of its client node 17, as well as the current "state" constituting all digital assets of its client node. By randomly assigning the verifier to its client node 17 to act as an impartial third party, the network prevents the client node 17 from engaging in invalid transactions or other improper actions such as double-spend (forks). In addition, a distributed transaction network blockchain 30 may be further implemented across the plurality of nodes 12 and stores the assignment of a single verifier to each node in the network. The distributed transaction network uses a blockchain to reach global consensus on assigning a verifier node to each transacting node, maintained by a plurality of mining nodes 13. A verifier node 19 may also perform the functions of a mining node 13.

Each transaction in the asynchronous directed acyclic transaction map 14 is updated locally by transaction parties 15 and their verifiers 19, and together with all other transactions updated by other transaction parties and their verifiers, constitute the full map 14. The local updates are then broadcast by the transaction party nodes 17 and their verifiers 19 to the entire network so that the transaction history is known globally. A verifier node 19 is required to keep a copy of the digital assets and the state of its client node 17, in addition to keeping a copy of all transactions of its client node 17. Because all confirmed transactions are broadcast to the entire network, any node 12 can keep a copy of the entire asynchronous directed acyclic transaction map 14 if they so choose.

The random selection of verifiers helps to ensure there is no prior relationship between the transaction parties and their verifiers, thereby preventing collusion or other improper actions by the verifier to benefit the transaction party. The distributed transaction network 10 may employ a randomized global consensus protocol to achieve a consensus amongst the verifier nodes 19 in order to randomly select a verifier for each transaction party. In certain embodiments, this consensus is achieved through the blockchain 30. In certain embodiments, the random assignment process is performed by mining nodes which use the blockchain to assign verifiers to each node joining the network. For example, turning now to FIG. 1B while continuing to refer to FIG. 1A, when a new node 15 comes onto the network, a verifier 19 is randomly assigned to the node, by the verifier nodes 19 via a blockchain mechanism 30.

In a preferred embodiment, only the verifier nodes 19 are required to store a part of the network of transactions 42 and the asynchronous directed acyclic map 14 that constitute other nodes' transactions, allowing transaction parties to take part in transactions without being required to copy large amounts of data. Furthermore, each verifier node 19 is only required to store a complete copy of all the transactions and the current state of its client nodes 15, corresponding to only a portion of the asynchronous directed acyclic transaction map 14, not a complete copy of the entire network of transactions 42. However, an insufficient number of participating verifier nodes 19 results in a smaller pool of potential verifiers, which delays the processing of transactions if the number of pending transactions exceeds the number of verifier nodes 19, and increases the likelihood that verifiers might fail or engage in fraudulent activities. Therefore, the reliability, trustworthiness, and processing power of the distributed transaction network depends on having a large number of participating verifier nodes 19. Each verifier may be paid a fee for each verified transaction as an incentive for participation. To ensure proper verification, each verifier is also required to submit a stake, typically represented by an amount of digital currency or other asset, which will be forfeited if the verifier improperly verifies the transaction. However, any verifier which detects that another verifier has improperly verified an invalid transaction, may be entitled to collect the stake forfeited by the failing verifier.

Continuing on to FIG. 1B, the blockchain 30 comprises a plurality of sequentially linked blocks 38 which each contain assignments of verifiers to nodes as well as other distributed computing actions 39. New blocks 38 may be created by the mining nodes 13 using a proof-of-work method or other conventional block creation method which will be apparent to one of ordinary skill in the art in the field of the invention. However, unlike a conventional blockchain, the distributed transaction network blockchain 30 does not store actual transaction data. The distributed transaction network blockchain is used to determine the assignment of verifiers to new nodes joining the network, as well as the assignment of a new verifier to a client node when the its previous verifier is determined to be failing, such as by verifying an invalid transaction, allowing a fork, or failing to verify a valid transaction after a specified amount of time has passed. In a preferred embodiment, when a node 12 is need of a new verifier—such as a new node joining the distributed transaction network 10 or an existing node which needs a failing verifier replaced, each mining node 13 randomly selects one of the verifier nodes 19 to become the new verifier and records this selection within the block which each mining node 13 is mining. The block produced by the mining node 13 which is the first to successfully mine its block is incorporated into the distributed transaction network blockchain 10 as the new block, and the distributed transaction network 10 carries out the assignment of new verifiers to their respective client nodes based on the assignment selections stored within the new block 38.

Turning now to FIG. 10 while continuing to refer to FIG. 1A, each transaction 40 is a mechanism which facilitates a change in control over transfer assets such as digital currency or digital representations of tangible goods, which takes place between the transaction parties 15. Each transaction party may be a transferor that transfers ownership or control of the transfer assets in its state, and/or a transferee who receives ownership or control of the transfer assets from the transferor. For example, an example transaction 40B has two associated transaction parties 15: "Party A" 16 and "Party B" 18. "Verifier A" 20 is the verifier for "Party A" 16, while "Verifier B" 22 is the verifier of "Party B" 18. The verifiers 19 are responsible for confirming whether the example transaction 40B is valid or invalid. When a verifier determines that the transaction is valid, the verifier will sign the transaction. Each transaction is considered a pending transaction until it is fully verified by all verifiers associated with the transaction parties, and all transaction parties and the associated verifiers sign the transaction, upon which the transaction is designated a confirmed transaction. Pending transactions are processed locally by the transaction parties and their respective verifiers. Confirmed transactions are broadcast to the entire network and added 40 to the asynchronous directed acyclic map 14, while invalid transactions are not signed and discarded.

Figure 1C:
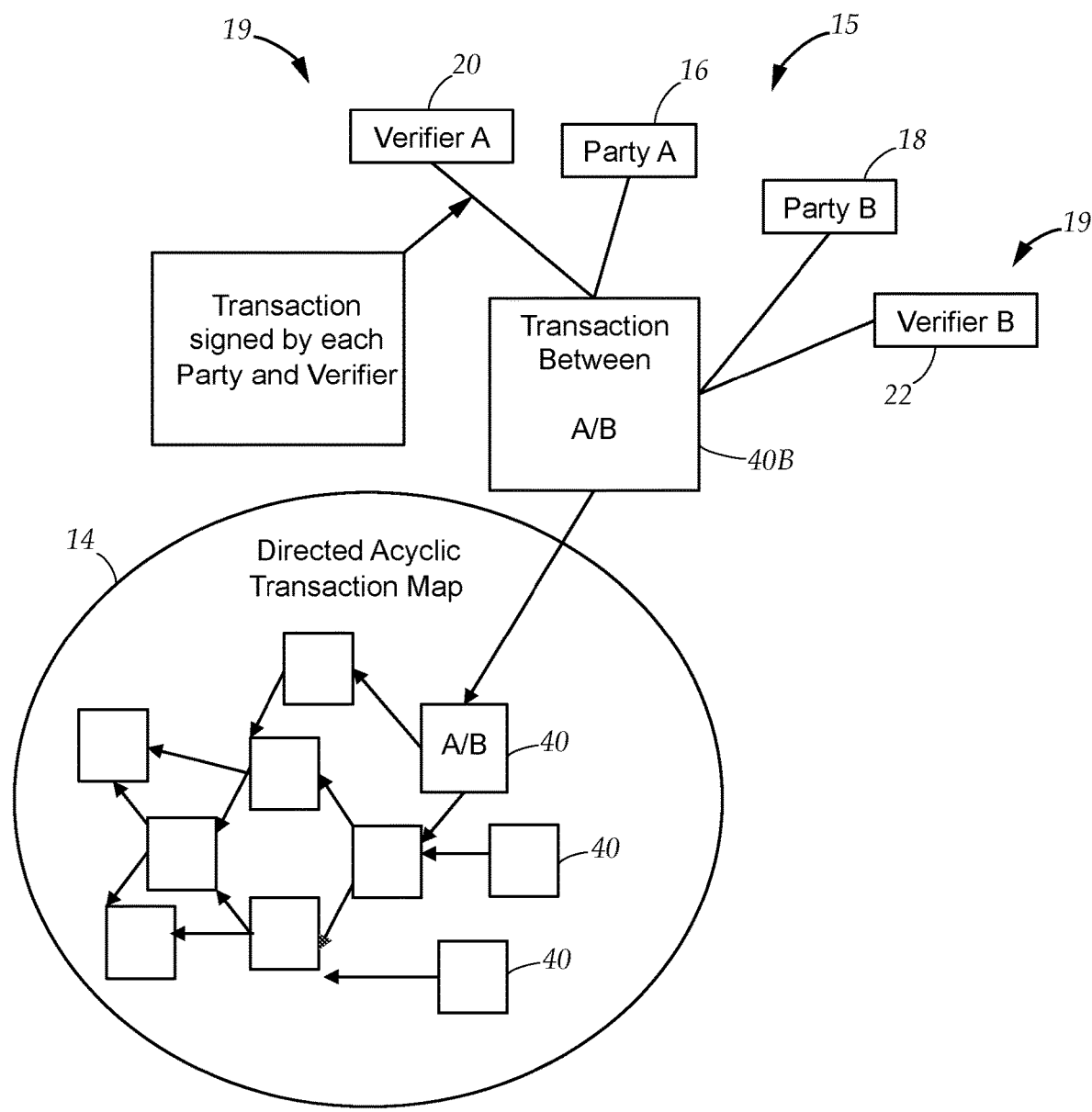
FIG. 1C is a block diagram depicting the relationship between the transaction parties and their respective verifiers, and the position of the example transaction within the asynchronous directed acyclic transaction map, in accordance with an embodiment of the present disclosure.
Figure 1D:
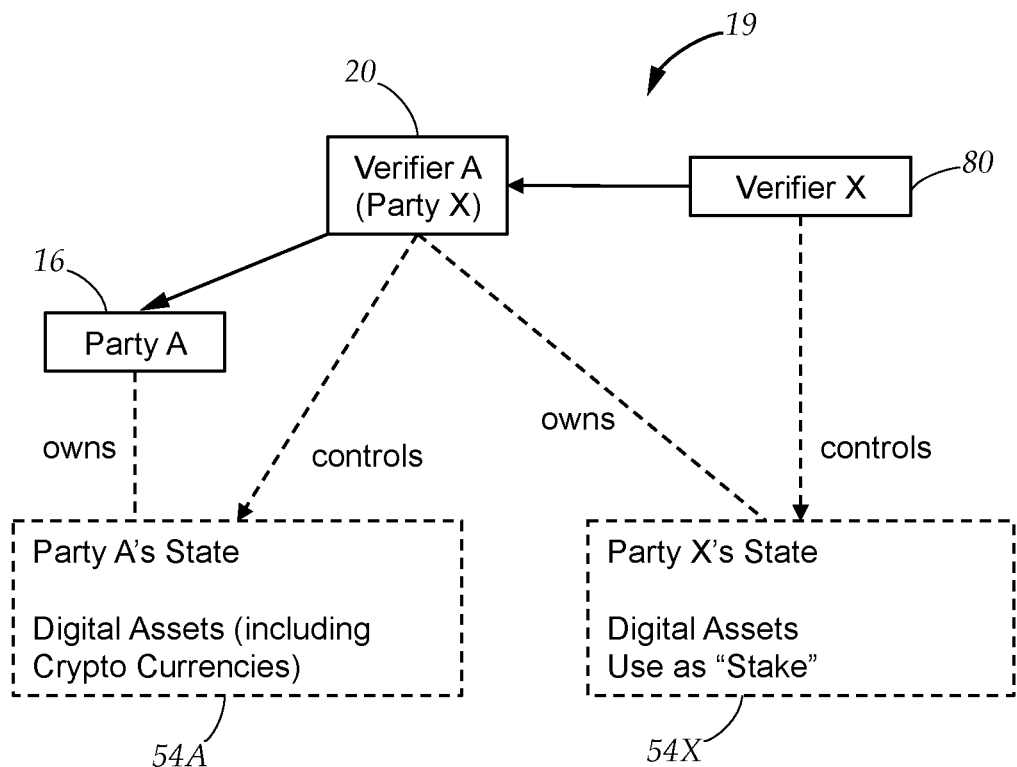
FIG. 1D is a block diagram depicting each transaction party's ownership of its digital assets collectively as its state, as well as the control over each transaction party's state by its verifier, and further shows how each verifier has its own verifier and is required to put up its digital asset as a stake, in accordance with an embodiment of the present disclosure.

Turning now to FIG. 1D, while still referring to FIG. 1A, each verifier node 19 will also have another verifier node assigned to it as its verifier. For example, while "Verifier A" 20 is the verifier for Party A 16, it also has a verifier assigned to itself. For example, "Verifier A" 20 may be referred to as "Party X" when "Verifier A" is participating as a transaction party, and its verifier may be referred to as "Verifier X" 80. In addition, as described previously, each node's entire set of digital assets (including cryptocurrencies) are controlled by its verifier. The entirety of its digital assets constitute the node's state. In this case, Party A's 16 digital assets are controlled by Verifier A 20. In turn, the digital assets of Verifier A 20 ("Party X") are controlled by Verifier X 80. The verifier, in performing its assigned functions, collects a transaction fee for providing the service. However, the verifier also gives a portion of its digital assets as a stake. In the event that the verifier fails its duty and signs an invalid transaction, or allows a fork by signing multiple successor transactions for its transaction party following the same predecessor transaction, then the stake can be confiscated and distributed to the other nodes on the network. This creates an incentive for the verifier to be honest and perform its functions according to the rules laid down here. If the verifier fails to do so, the distributed transaction network can confiscate the failing verifier's digital assets in the form of its stakes, and reverse the invalid transactions.

Figure 3:
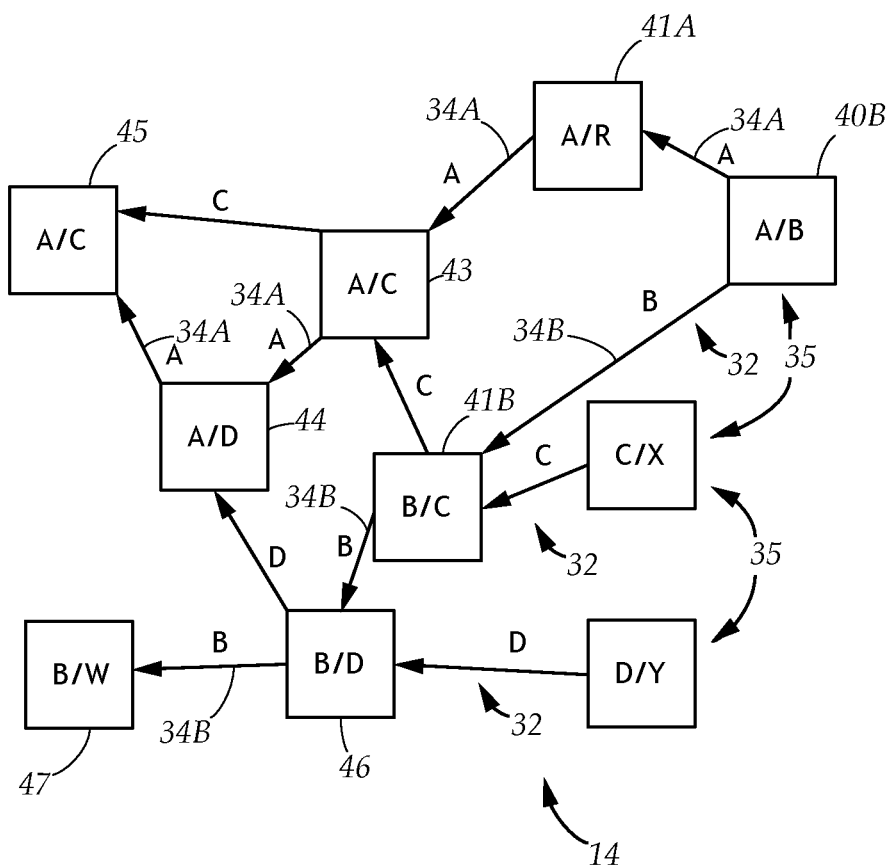
FIG. 3 is a block diagram depicting the asynchronous distributed acyclic transaction map, in accordance with an embodiment of the present disclosure.

Turning now to FIG. 3, while continuing to refer to FIGS. 1A-C, the asynchronous directed acyclic transaction map 14 comprises a plurality of vertices 35 connected via a plurality of edges 32. Each vertex 35 represents one transaction 40 conducted between at least two transaction parties, while each edge 32 connects each transaction with another transaction having at least one transaction party in common. The edges 32 are unidirectional so that the transactions 40 are topologically sorted, with each edge 32 shown as an arrow pointing from one vertex to another vertex representing a predecessor transaction which occurred earlier in time.

Figure 2A:
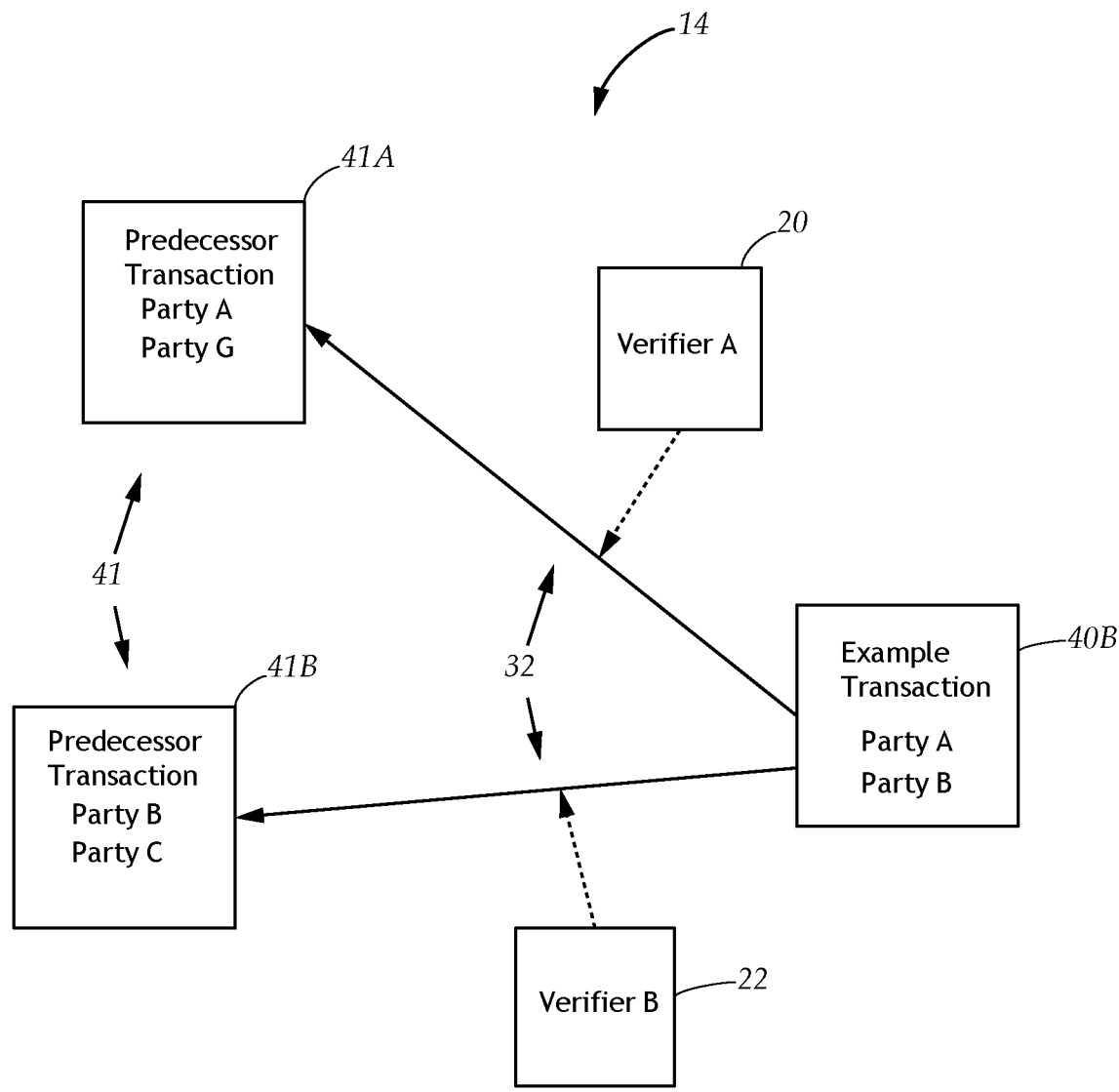
FIG. 2A is a block diagram depicting a pending transaction and two predecessor transactions, in accordance with an embodiment of the present disclosure.

Referring now to FIG. 2A, while continuing to refer to FIG. 3, the example transaction 40B is connected by two edges 32 with two predecessor transactions 41, including a first predecessor transaction 41A and a second predecessor transaction 41B, both occurring prior to the example transaction 40B as indicated by the arrows which form each edge 32. The example transaction 40B and the first predecessor transaction 41A have "Party A" as a transaction party in common, while the example transaction and the second predecessor transaction 41B have "Party B" as a transaction party in common. All the transactions involving any particular transaction party, for example "Party A", form a single transaction path, (or "sequence"), which connects the most recent transaction of that transaction party with the earliest transaction of the transaction party. When a transaction is signed by each transaction party and their respective verifiers, the new transaction is added to the asynchronous directed acyclic transaction map 14 and is connected to the most recent predecessor transactions associated with each transaction party in the asynchronous directed acyclic transaction map. The transactions within the single transaction path form a topologically sorted sequence where each transaction, with the exception of the earliest occurring transaction, is connected to a single predecessor transaction, ensuring that the transactions of each particular transaction party are processed sequentially in order to prevent the occurrence of a race condition, a fork, or a potential double spend attempt affecting the assets of the transaction party as a transferor. For example, in FIG. 3, "Party A" is a transaction party to five transactions in the example asynchronous directed acyclic transaction map 14, as represented by the topologically sorted vertices representing transactions numbered as 40B, 41A, 43, 44, and 45, and connected by the transaction path edges 34A. These transactions collectively form the transaction path of "Party A". The example transaction 40B is the newly initiated transaction, while the transaction 45 is the earliest transaction to occur. Transaction party B's transactions 40B, 41B, 46 and 47 are connected in a single sequence connected by the transaction path edges 34B. Furthermore, the transaction paths of different transaction parties may intersect within the asynchronous directed acyclic transaction map 14 at any vertex representing a transaction in which the transaction parties are common participants. For example, the transaction path of "Party A" and the transaction path of "Party C" intersect at the transactions numbered as 43 and 45.

Furthermore, unlike conventional blockchain transactions which are subject to lengthy delays mandated by the block creation process whereby the blockchain transactions must be selected to be included in the block before it is considered confirmed, the transactions of each transaction party within the distributed transaction network may be executed asynchronously in relation to the transactions of other unrelated transaction parties. For a pending transaction, only the transaction parties and their respective verifiers are involved. Once the pending transaction is signed by all its transaction parties and their verifiers, execution of the transaction may occur immediately—there is no need to delay the execution of confirmed transactions by waiting for block creation and global consensus as in a conventional blockchain network.

Figure 2B:
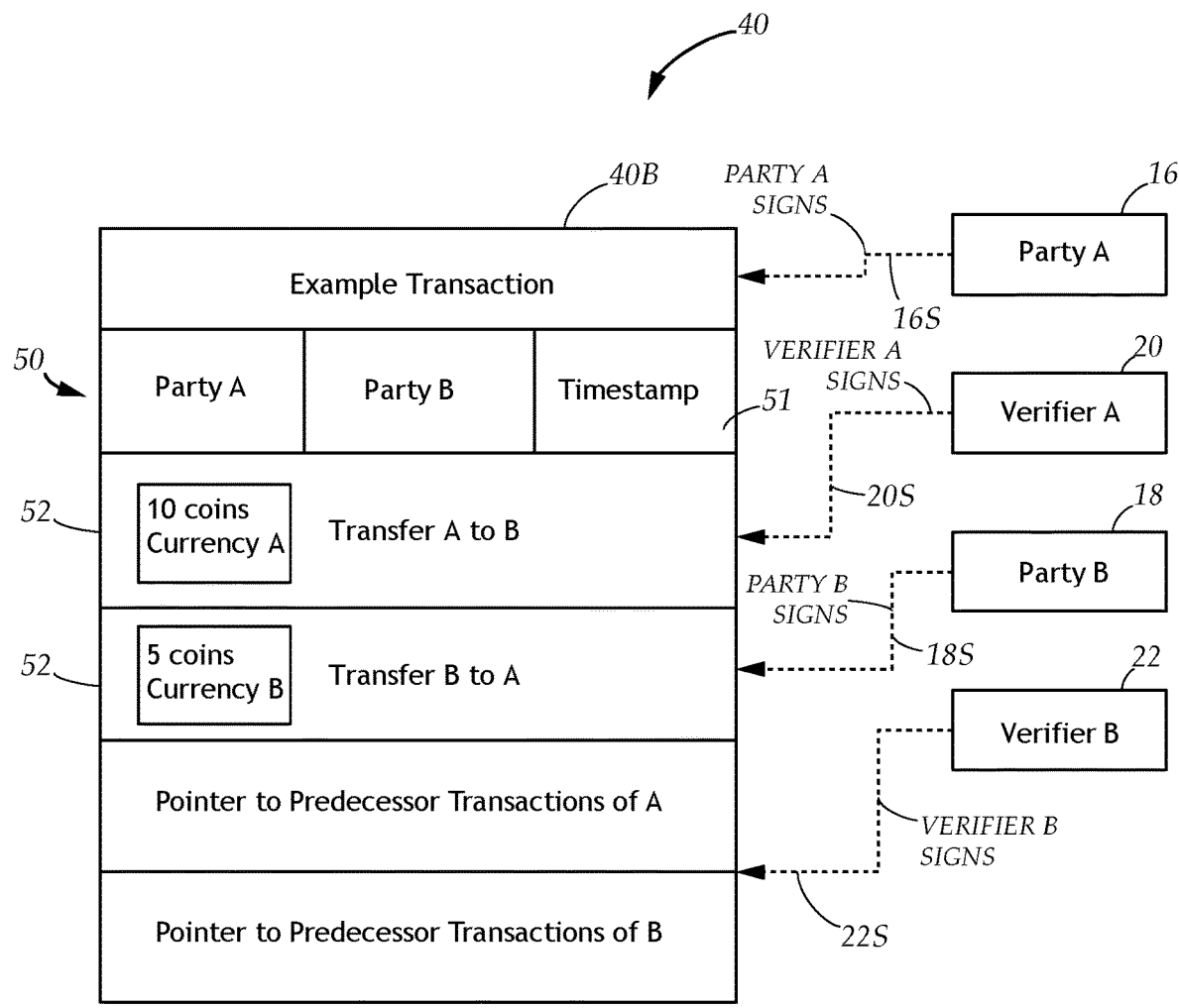
FIG. 2B is a block diagram depicting an example transaction having transaction parameters, being signed by each of the transaction parties and their respective verifiers, in accordance with an embodiment of the present disclosure.

Referring now to FIG. 2B while continuing to refer to FIG. 2A, the topological sorting of the asynchronous directed acyclic transaction map and the transaction paths are reflected in the transaction data itself. The transaction data for each transaction defines the predecessor transactions to which said transaction points to and may include a pointer or a hash identifying the predecessor transaction for each transaction party involved in the current transaction. The detailed transaction data for each transaction may be stored within other nodes' copy of the asynchronous distributed acyclic transaction map 14, but must be stored within the transaction history maintained by each verifier node for its client node the transaction party, or its copy of the asynchronous distributed acyclic transaction map.

Continuing to refer to FIG. 2B as well as FIG. 2A, each transaction 40 has one or more transaction parameters 50. The transaction parameters 50 define the transaction parties involved in the transaction, and include a timestamp 51 which indicates the time which the transaction was initiated. The transaction parameters 50 further comprise transfer details 52 which identify the transferor and the transferee, and may also describe, either generally or with specificity, the transfer assets each transferor is required to transfer to the transferee as part of the transaction obligation. The transaction parameters 50 may describe the type and the amount of the transfer assets. For example, the transaction parameters 50 may specify that the transfer asset is an amount of digital currency (including cryptocurrency), an amount of a fiat currency, a digital representation of a specific quantity of a tangible good, or other unit that quantifies the digital assets which constitute the transfer asset. In the example transaction 40B, the transfer details 52 indicate that both "Party A" 16 and "Party B" 18 are transferors as well as transferees. Therefore, "Verifier A" 20 must verify that Party A can honor the transfer from "Party A" to "Party B", while "Verifier B" 22 must verify that Party B can honor the transfer from "Party B" to "Party A".

Figure 2C:
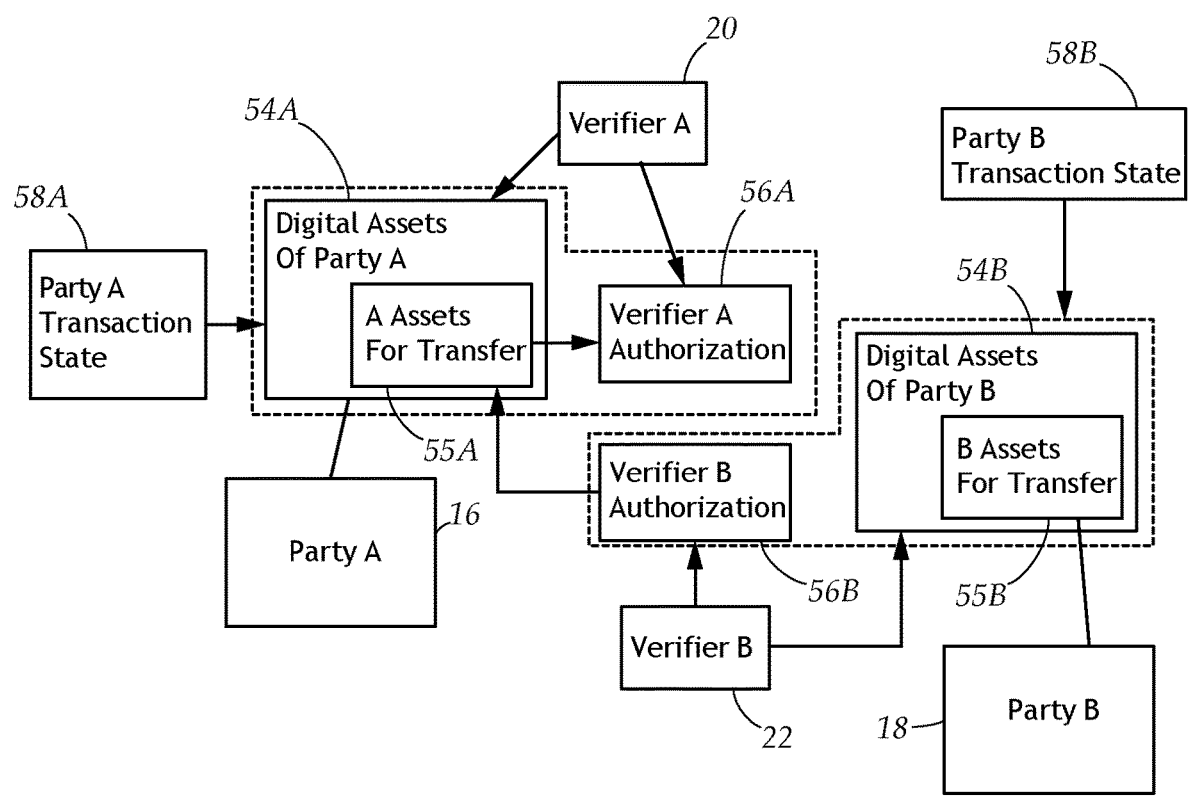
FIG. 2C is a block diagram depicting the states of each transaction party, in accordance with an embodiment of the present disclosure

Turning now to FIG. 2C, while continuing to refer to FIGS. 1A-D and FIGS. 2A-B, each transaction defines the transfer assets and the amount or balance of said assets to be transferred in the transaction. All transfers by a transaction party in a transaction are implemented via a state transition which alters the states of both the transferor and the transferee, resulting in a change in the amount of the transfer assets owned by the transaction parties as a result of the transaction. The execution of state transitions is controlled by the verifier of the transaction party. Each verifier must verify the amount of the digital assets of its transaction party to ensure that the transaction party, when acting as the transferor, has sufficient digital assets to transfer and satisfy the transaction party's transaction obligations, and further provides each verifier with the ability to approve or deny a state transition which transfers control of the transfer asset from the transferor to the transferee. For example, "Verifier A" 20 and "Verifier B" 22 have control over the states of "Party A" 16 and "Party B" 18 respectively. "Verifier A" verifies that the digital assets of "Party A", represented for example by the state 54A of Party A, contain a sufficient amount of digital currency 55A corresponding to the transfer asset which "Party A" is obligated to transfer, and can authorize or deny the state transition which transfers the digital currency 55A to the state 54B of "Party B". Similarly, "Verifier B" 22 verifies that the state 54B of "Party B" contains a sufficient amount digital currency 55B which "Party B" is obligated to transfer, and may approve or deny the state transition. Furthermore, to allow for state transitions to be reversed, the verifier of each transaction party may maintain the transaction history for its transaction party which details each state transition of each transaction party which were executed. In order to reverse transactions, the states and the digital assets of the transferor and the transferee may be restored to their original condition prior to the execution of the transaction. It is important to note that the state of each transaction party is not maintained in any centralized data store, but only exists locally as maintained in the digital storage of the transaction party itself and its verifier. To the extent other nodes obtain all the transactions through the broadcast, they can also maintain a copy of the state of any transaction party 17, and if another node becomes the verifier of any transaction party 17, it can then seamlessly take over the control of the state of transaction party 17.

The distributed transaction network may have a unique cryptocurrency native to the distributed transaction network itself, with the asynchronous directed acyclic transaction map serving as the distributed ledger. For example, this unique cryptocurrency can be used to pay verifiers for processing and verifying transactions. Mining nodes may also be rewarded for mining new blocks by receiving rewards in the unique cryptocurrency. In addition to the unique cryptocurrency, the distributed transaction network may be further adapted to access third party payment processors or payment solutions as needed in order to implement the transfer of digital or fiat currencies or other assets as required. As will be apparent to a person of ordinary skill in the art in the field of the invention, the distributed transaction network may be adapted to generate the appropriate states and the state transitions to facilitate the transfer of various types of assets between the transaction parties.

Returning to FIG. 2B while continuing to refer to FIG. 1A and FIG. 2C, the status of each transaction 40 is changed from a pending transaction to a confirmed transaction once each transaction party and each verifier have signed the transaction using a digital signature unique to the transaction party or verifier. In a preferred embodiment, each transaction party and each verifier has a public-private key pair, whereby the private key is employed to sign the transaction, and the public key is employed by other nodes to verify the signature is valid. Each transaction party signs 16S, 18S the transaction to authenticate the transaction and indicate that the transaction obligations are in accordance with the transaction party's understanding of the transaction. Each verifier signs 20S, 22S the transaction upon verifying the state of the transaction party and authorizing the state transition. Any approved state transitions which would cause a change in control over the digital assets do not proceed until the transaction is designated a confirmed transaction via the signatures of all the related verifiers. Once the transaction has been confirmed, the confirmed transaction is then broadcast to all nodes 12 of the transition network 10, and the transaction network permits the state transitions to execute.

Figure 4:
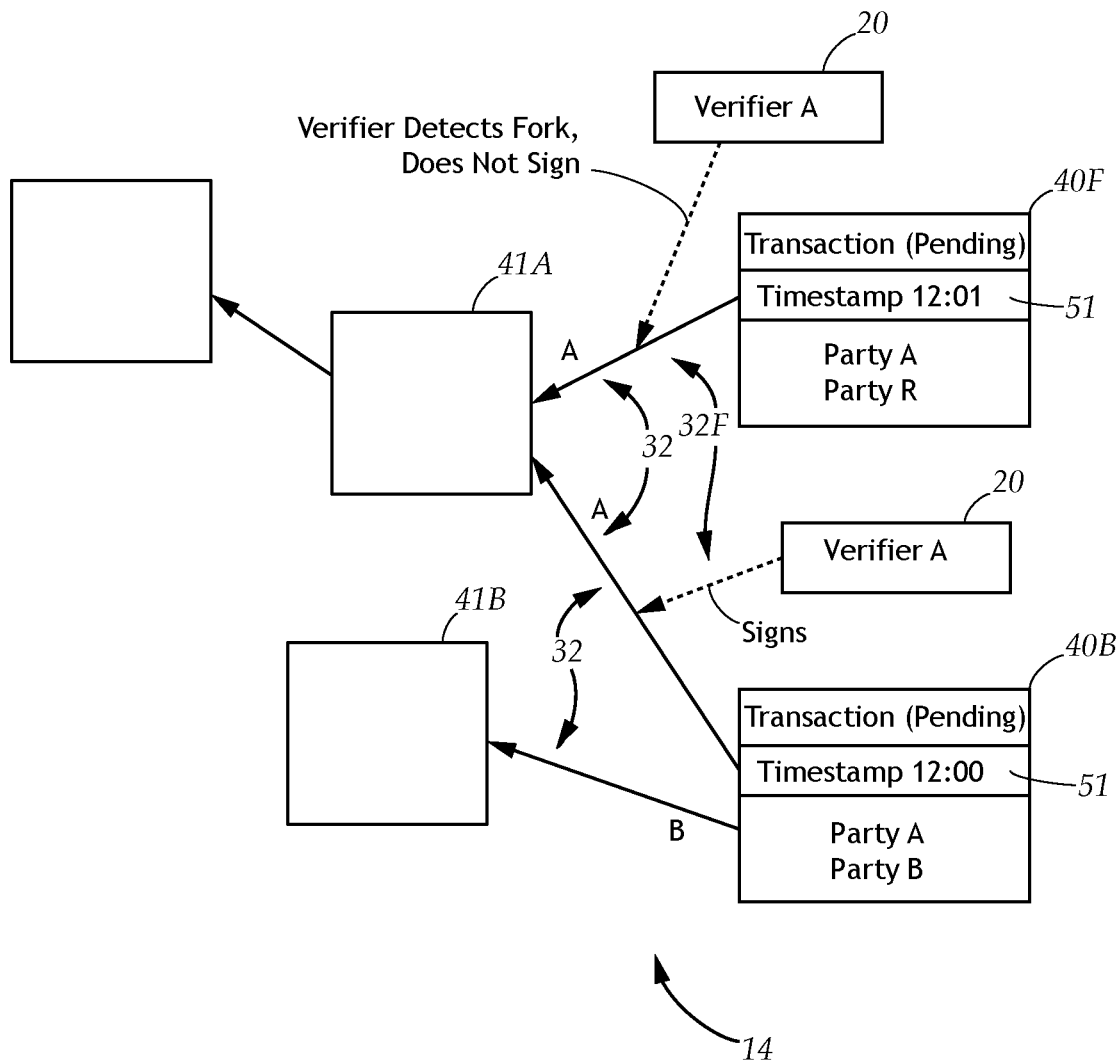
FIG. 4 is a block diagram depicting a fork condition whereby multiple pending transactions having the same transaction party point to a single predecessor transaction, in accordance with an embodiment of the present disclosure.

Turning to FIG. 4 while also referring to FIG. 1A and FIGS. 2A-B, the transaction network 10 is adapted to prevent the creation of a fork (or double spend) for any particular transaction party within the asynchronous directed acyclic transaction map 14, with each fork corresponding to a condition when two or more subsequently occurring transactions in which a transaction party is a transferor point to a single predecessor transaction. A transaction party may create a fork by initiating a new transaction when the transaction party is already taking part in another pending transaction, or by initiating two or more transactions simultaneously. FIG. 4 depicts a portion of the asynchronous directed acyclic transaction map 14 similar to that found in FIG. 2A, with the addition of a fork 32F created by the addition of a second example transaction 40F pointing to the first predecessor transaction 41A. Both the example transaction 40B and the second example transaction 40F are pending transactions connected to the first predecessor transaction 41A, with the example transaction 40B having a timestamp 51 of 12:00, while the second example transaction 40F has a timestamp 51 of 12:01 which indicates that the second example transaction 40F was initiated by "Party A" while the example transaction 40B is still pending. However, because the transaction Party A cannot effectuate any transaction unless its verifier signs it, the second transaction will not be confirmed. If the verifier is asked to verify more than one transaction for the client transaction party, then only one transaction will be approved by the verifier and signed, thus preventing a fork condition. In the present example, Party A's Verifier A 20 determines that the predecessor transaction 41A of the second example transaction 40F is pointed to by two subsequently occurring transactions in which "Party A" is a transferor: the example transaction 40B and the second example transaction 40F. Therefore, "Verifier A" will not sign the second transaction 40F. The second transaction 40F is discarded and will not be broadcast to the network as a confirmed transaction nor be part of the asynchronous directed acyclic transaction map.

Figure 5:
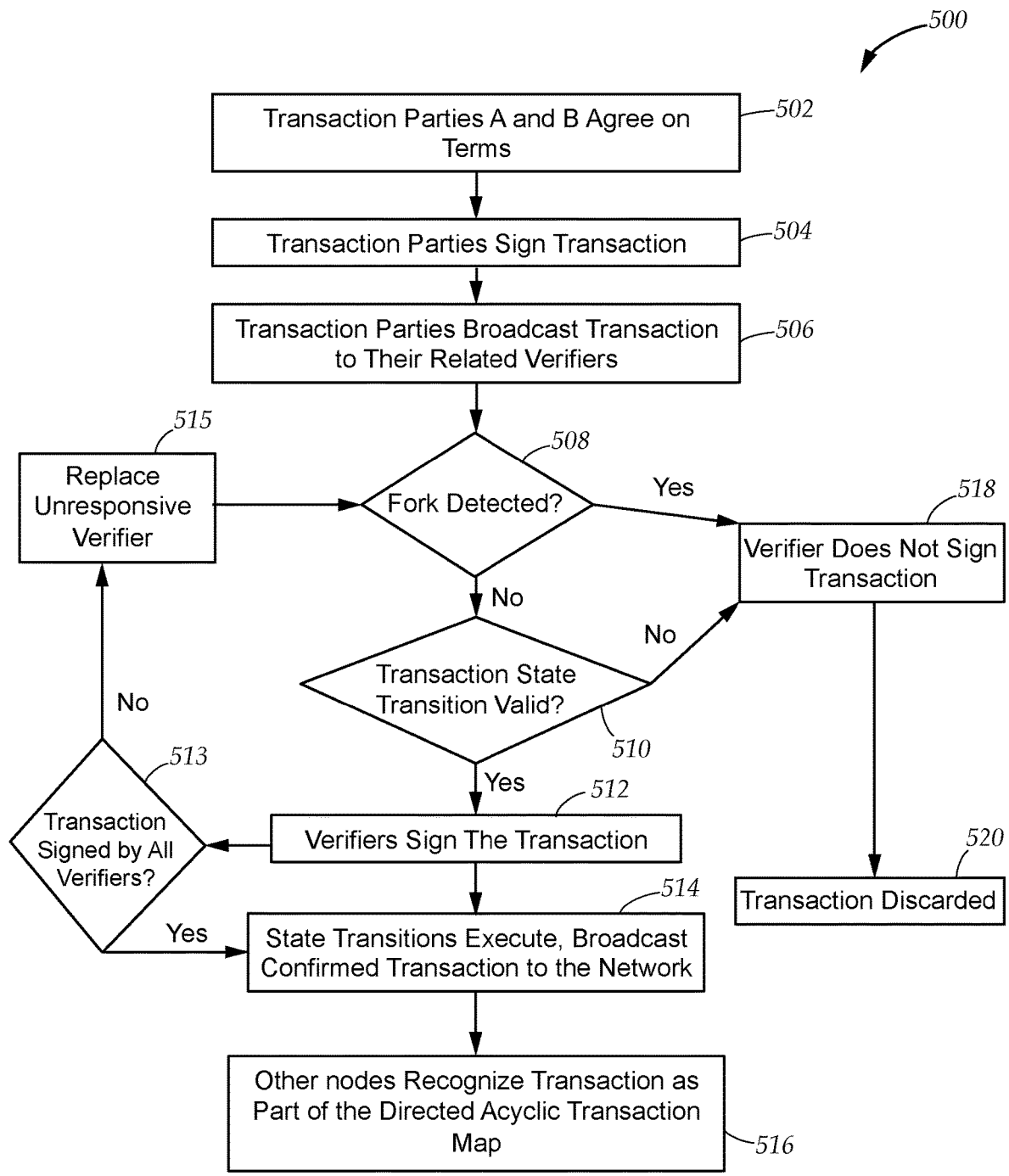
FIG. 5 is a flowchart depicting an exemplary transaction process flow by which the distributed transaction network facilitates and verifies transactions, in accordance with an embodiment of the present disclosure.

Turning now to FIG. 5 while also referring to FIG. 1A and FIG. 2B, an exemplary transaction process 500 illustrates a series of steps by which the distributed transaction network 10 processes the example transaction 40B from initiation to completion. Referring back to the example transaction 40B depicted in FIGS. 2A-C, while continuing to refer to FIGS. 1A, and 3, the transaction process 500 begins at step 502 when the transaction parties "Party A" 16 and "Party B" 18 initiate the example transaction 40B. Here, the transaction parties define the transaction parameters 50. For example, the transaction parameters 50 may specify that "Party A" will transfer ten units of digital currency A to "Party B", while "Party B" will transfer five units of digital currency B to "Party A". At step 504, the example transaction 40B is then signed by the transaction parties. Here, the transaction parties authenticate the transaction by digitally signing the transaction, indicating that each transaction party consents to the transaction and that the transaction parameters are correct. The process then proceeds to step 506, and the example transaction 40B is sent to each of the transaction parties' verifier nodes 19 on the distributed transaction network 10 as a pending transaction.

Referring to FIG. 1A and FIG. 2A while continuing to refer to FIG. 5, only the verifiers assigned to each transaction party are required to verify the transaction, allowing each transaction to be processed in an asynchronous manner. The process proceeds to step 508, and each verifier must ensure that the example transaction 40B does not create a fork in the asynchronous directed acyclic transaction map 14 for its associated transaction party. "Verifier A" 20 and "Verifier B" 22 must ensure that the predecessor transactions of the example transaction 40B are each connected to only a single subsequently occurring transaction in which their assigned transaction parties are taking part. "Verifier A" 20 reviews the asynchronous directed acyclic transaction map 14 and verifies that only one subsequently occurring transaction points to the first predecessor transaction 41A, while "Verifier B" 22 performs the same for the second predecessor transaction 41B. Note that for the purpose of verifying pending transactions, the pending transactions are processed locally by each verifier. In the present example, no fork condition exists, and the process proceeds to step 510 and the verifiers each verify the state of their assigned transaction parties. Here, each verifier then verifies that its transaction party can properly enter into the transaction, by ensuring that the transaction party's prior state contains sufficient digital assets to supply the transfer asset if the transaction party is acting as a transferor. Once each verifier determines that the transaction of its transaction party is valid, the verifier signs the transaction at step 512, and the transaction is confirmed once the transaction has been signed by all relevant verifiers. Here, the verifiers and transaction parties may update their local copies of the asynchronous directed acyclic transaction map, and the transaction 40B is added to the asynchronous directed acyclic map 14 and is connected by edges 32 to the most recent predecessor transactions having transaction parties in common with the example transaction 40B. Next, all the transaction parties and their verifiers broadcast the confirmed transaction, along with the signatures from all the transaction parties and their verifiers, to the entire network at step 514. At step 516, all other nodes on the network which are maintaining the asynchronous directed acyclic transaction map 14 proceed to add the confirmed transaction to their copy of the asynchronous directed acyclic transaction map, and the asynchronous directed acyclic map is thus updated with the new valid transaction across the entire network. Conversely, if any verifier determines, at steps 508 or 510 respectively, that either the transaction creates a fork or the transaction is invalid given its transaction party's prior state, the process continues to step 518 and the verifier does not sign the transaction. The invalid transaction is then discarded at step 520.

Returning now to FIG. 1A and FIGS. 2A-C while continuing to refer to FIG. 5, additional details on the implementation of steps 510 and 512 are now supplied. In a preferred embodiment, each verifier may first verify that the transaction does not create a fork for its transaction party at step 508, and then determine, at step 510, if the state is valid and the digital assets are accessible and ready to transfer to the transferee via a state transition. However, note that this order is non-limiting, and the verifiers may, in other embodiments, first determine the validity of the states of their transaction parties before checking for the occurrence of fork conditions. The example transaction 40B contains two transfers 52, and both "Party A" 16 and "Party B" 18 are transferors as well as transferees. The state 58A of "Party A" indicates that the digital assets 54A of "Party A" contain an amount of digital asset 55A, currently controlled by "Party A", which is to be transferred to the ownership of "Party B". As the assigned verifier of "Party A" 16, "Verifier A" 20 is authorized to inspect the digital asset 55A of "Party A" and verify that the digital assets 55A contain ten units of digital currency "A", matching the type and amount specified in the transaction parameters 50, and that ownership over the digital assets 55A of "Party A" is transferable to "Party B". Similarly, "Verifier B" 22 is able to verify that the digital assets 55B of "Party B" contain five units of digital currency "B", as specified in the transaction parameters 50. After verifying the state of its assigned transaction party, each verifier signs the transaction at step 512, and authorizes the state transition which would transfer control over the transfer asset from the transferor to the transferee. However, authorized state transitions are not executed until after the transaction is confirmed. Once all the transaction parties and their respective verifiers have signed the transaction, the status of the transaction switches from pending to confirmed, and the confirmed transaction is broadcast to the distributed transaction network 10 at step 514. The state transitions of the confirmed transaction are then executed, and all the verifier nodes 19 update the asynchronous directed acyclic transaction map 14 at step 516 to indicate that the transaction is completed. Transactions which have executed state transitions are therefore designated completed transactions.

Returning to step 513, if the verifier is unresponsive and does not verify the state of its transaction party after a certain amount of time has passed, the transaction party associated with the verifier may report the verifier as being unresponsive, and the distributed transaction network 10 may, at step 515, replace the unresponsive verifier through global consensus amongst the network nodes using the global consensus mechanism and randomly assign a new verifier to the transaction party. The process then returns to step 508, and the newly assigned verifier proceeds to check for fork conditions and verify the transaction.

Figure 6:
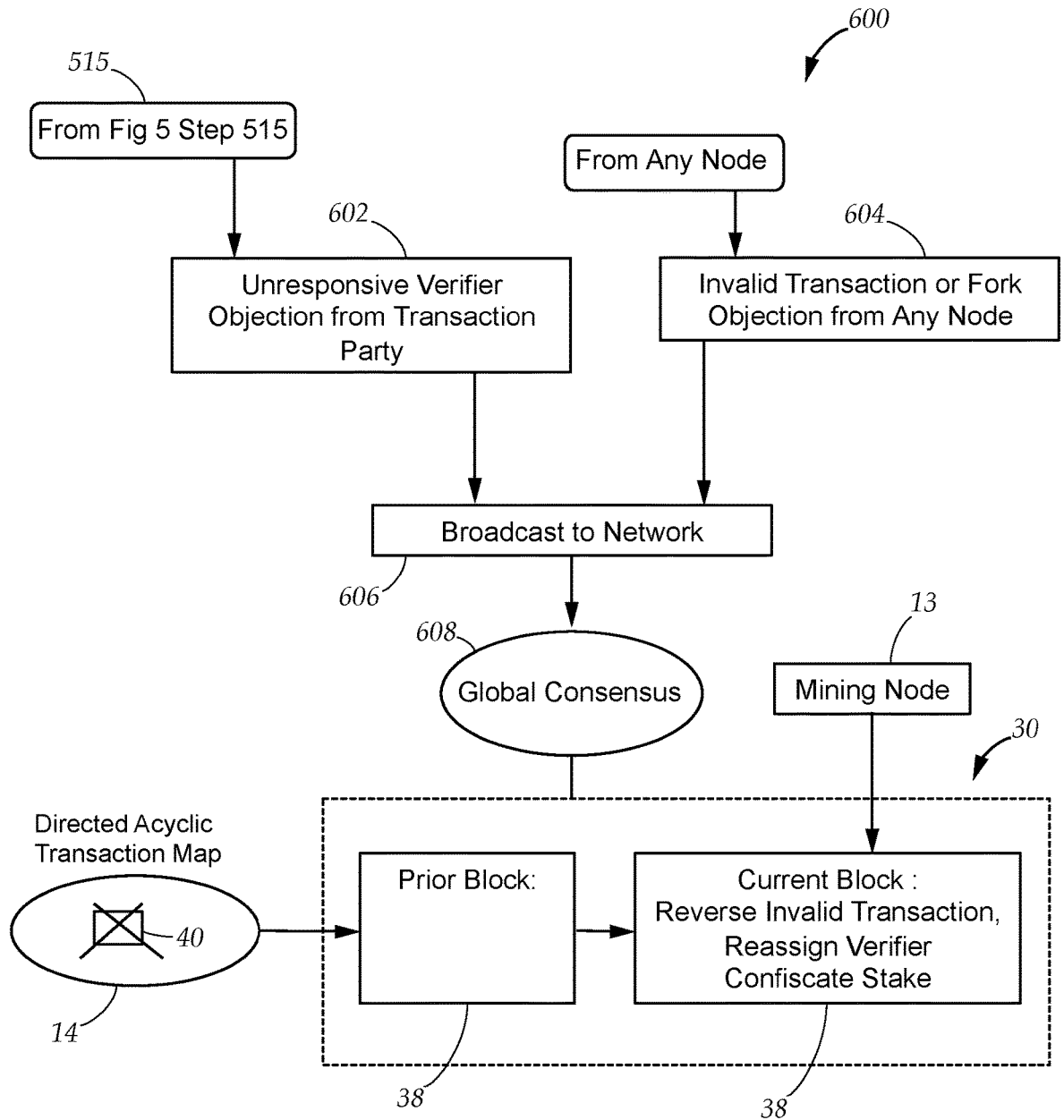
FIG. 6 is a flowchart depicting a post-confirmation verification process, in accordance with an embodiment of the present disclosure.

Turning now to FIG. 6, an exemplary post-confirmation monitoring and corrective process 600 for detecting failing verifiers, reversing invalid transactions, and reassigning verifiers is shown. Continuing to refer to FIG. 6, but also referencing the transaction process 500 depicted in FIG. 5 as well as FIG. 1A and FIGS. 2A-C, any node 12 on the distributed transaction network 10 which maintains a more comprehensive copy of the asynchronous distributed acyclic transaction map 14 may perform a post-confirmation monitoring and verify the validity of any confirmed transaction which has been broadcast to the network. Each such node, also referred to as a monitor node, may monitor any confirmed transaction to determine whether any of the verifiers associated with the confirmed transaction have improperly signed the confirmed transaction, such as by signing the transaction when the transaction of its assigned transaction party is invalid because its state does not contain sufficient digital asset to transfer, or signing the transaction even though it creates a fork condition. To determine the validity of the transaction, the monitor node may ensure that the transferor has sufficient digital assets to fulfill its obligation defined by the parameters of the transaction. Furthermore, the node must also ensure that the confirmed transaction has not created a fork condition by reviewing the asynchronous directed acyclic transaction map to check whether any of the predecessor transactions of the confirmed transaction is pointed to by more than one successor transaction of the same transaction party. If the monitor node determines that any confirmed transaction is invalid and was improperly signed, it may broadcast an objection to the distributed transaction network which identifies the verifier which has improperly signed the transaction and the reason why the transaction is invalid—such as the presence of a fork condition and/or an invalid transaction. Similarly, any transaction party determining that its assigned verifier is unresponsive may broadcast an unresponsive verifier objection.

The post-confirmation monitoring and corrective process 600 may be initiated at step 604 whenever one of the monitor nodes determines one of the confirmed transactions has been improperly signed, and said monitor node then broadcasts an invalid transaction or fork objection to the distributed transaction network 10 at step 606. In addition, any transaction party can raise an unresponsive verifier objection to their own unresponsive verifier at step 602, and then broadcast the unresponsive verifier objection to the network at step 606. In each case, the objections are broadcast to the entire network 606, and if the objection is correct, the global consensus mechanism 30 may employ a global consensus protocol at step 608 to replace the unresponsive or failing verifier, confiscate and redistribute the stake of said verifier, as well as reverse the invalid transaction signed by the verifier where applicable. This consensus can be achieved using the blockchain 30, by which a mining node 13 can then reverse an invalid or fork transaction, and replace the offending verifier with a new randomly selected verifier recorded in a newly created block 38 on the blockchain 30. In a preferred embodiment, the mining nodes 13 receive the objections broadcast to the network at step 606, and immediately begin to mine the new block 38 of the distributed transaction network blockchain 30. Referring back to FIG. 1B while continuing to refer to FIG. 6, each mining node 13 acts upon the broadcast objections and incorporates an appropriate corrective action into the new block. The corrective actions may include the removal of each unresponsive or failing verifier and assignment of new verifiers to replace the verifiers which have been removed, reversing invalid transactions or fork transactions, and confiscating the stakes of failing verifiers. The block produced by the first mining node 13 to mine the new block is then incorporated into the blockchain 30, and the corrective actions stored within the new block 38 are carried out by the distributed transaction network. New blocks are continually mined by the mining nodes 13, allowing the distributed transaction network to continually carry out the appropriate corrective actions in response to the objections broadcast to the network.

Once an invalid or fork transaction 40 is reversed, it is then discarded from the asynchronous directed acyclic transaction map 14. When the stake of a failing verifier is confiscated, it is re-distributed to the nodes on the network in any agreed-upon protocol. For example, the node which first broadcast the objection which leads to the removal of the failing verifier may be rewarded by receiving the stake of the failing verifier, thus providing an incentive for the nodes to perform the post-confirmation monitoring. The payment of fees and rewards, and the redistribution of stakes may be carried out and processed as a new transaction on the distributed transaction network, initiated by the monitor nodes and/or mining nodes instead of the transaction parties. For example, the redistribution of a stake may involve the failing verifier and the node which broadcast the objection as transaction parties, with the roles of transferor and transferee respectively.

A person of ordinary skill in the art in the field of the invention will appreciate that various protocols may be utilized to allow all the nodes on the entire distributed network collectively to arrive at a single conclusion. In alternate embodiments, global consensus can be achieved across all the verifier nodes 19 without using the blockchain, and the verifier nodes may assign verifiers and initiate corrective actions utilizing consensus protocols appropriate for distributed computing systems.

In summation, the distributed transaction network reduces processing time by allowing only transaction parties and verifiers to create and sign transactions, which occur locally and asynchronously from the rest of the network, therefore bypassing the global synchronization mechanism of the conventional blockchains. The blockchain global consensus process is not needed for the verification of transactions, nor are the confirmed transactions written to the blockchain, but rather the transactions are stored in the asynchronous directed acyclic transaction map 14 and broadcast to the entire network. This allows transactions to be effected by only a few parties, locally, asynchronously, and in parallel, resulting in fast execution. Meanwhile, the integrity of the transaction network is preserved not only by the digital signatures of all the transaction parties and their verifiers, but also the requirement that each verifier is randomly assigned to each transaction party, and ensuring that the verifier verifies every transaction of its transaction party and prevents a fork or a double-spend. Verifiers are discouraged from improperly verifying transactions by requiring the verifier to offer its own digital assets as a stake which is subject to confiscation upon improperly verifying transactions. Such stakes will be confiscated and re-distributed to other nodes through a global consensus mechanism, possibly implemented using the blockchain.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an asynchronous or concurrent programming language such as go or Javascript, a functional programming language like Haskell, an object oriented programming language such as Java, Smalltalk, C++ or the like and conventional procedural programming languages, such as the "C" programming language or similar programming languages. Other types of languages include XML, XBRL, HTML5, Python or Web Assembly. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. Each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flow diagrams depicted herein are just one example. There may be many variations to this diagram or the steps (or operations) described therein without departing from the spirit of the disclosure. For instance, the steps may be performed in a differing order and/or steps may be added, deleted and/or modified. All of these variations are considered a part of the claimed disclosure.

In conclusion, herein is presented an asynchronous directed acyclic map-based distributed transaction network. The disclosure is illustrated by example in the drawing figures, and throughout the written description. It should be understood that numerous variations are possible, while adhering to the inventive concept. Such variations are contemplated as being a part of the present disclosure.

What is claimed is:

1. A method for asynchronously facilitating, validating, and executing transactions, comprising the steps of:
providing a distributed transaction network having a plurality of nodes which are connected via a network, each node having a state consisting of digital assets, the plurality of nodes further including a plurality of verifier nodes, the plurality of verifier nodes are utilized to verify all transactions in the distributed transaction network to ensure the integrity of these transactions and maintain this network and further perform distributed computing operations, using a global consensus mechanism under specific conditions to correct for failures of verifiers;
providing a transaction verification system to maintain the validity of all transactions including an asynchronous directed acyclic transaction map stored via the distributed data store and comprising a plurality of vertices, each vertex represents one transaction having a plurality of transaction parties each corresponding to one of the plurality of nodes, the transaction parties further comprise of at least a transferor and a transferee or potentially more, each vertex which represents a successor transaction must point to at least one other vertex via a unidirectional edge, whereby each vertex which is pointed to by the successor transaction represents a predecessor transaction occurring earlier than the successor transaction, and whereby one of the transaction parties of each predecessor transaction matches one unique transaction party of the successor transaction;
assigning a verifier to each new node upon it joining the distributed transaction network, by randomly selecting one of the plurality of verifier nodes to become the verifier of this new node when it first joins the network, by using a global consensus mechanism, and ever after this assignment, the state of the new node is controlled by its verifier;
engaging in multiple transactions by each node, each of the transactions must be verified and confirmed by the transaction party node's verifier node;
initiating a new pending transaction by the transaction parties sending the transaction parameters to their respective verifiers and signing the transaction;
defining transaction parameters for the pending transaction comprising a transaction obligation for each transferor which identifies and quantifies the amount of a transfer asset to be transferred by the transferor to the transferee;
defining a state transition from a transaction as the transfer of the transfer asset from the transferor to the transferee and the resulting change in the digital asset balance of both the transferor and the transferee, as transitions in the states of both the transferor and the transferee;
confirming and executing each transaction only upon the authorization and signing of the transaction by the verifiers of each of the transferors and the transferees in the transaction;
verifying the pending transaction by the verifier of each transaction party, each verifier verifying that the balance of the transfer asset in the state of the verifier's transaction party is sufficient to satisfy this party's obligation in the pending transaction;
verifying there is only one successor transaction for each transaction party by its verifier after this party's predecessor transaction, ensuring there is no fork or race condition for this transaction party, thus preventing double-spend of its transfer assets;
designating the pending transaction as invalid by the verifier of one of the transaction parties upon the verifier determining that the state of its transaction party does not satisfy the transaction obligation or there is more than one successor transaction for this transaction party, and discarding the invalid pending transaction;
designating the pending transaction as a confirmed transaction by the verifier signing the transaction, only upon every verifier verifying the pending transaction, and authorizing of the state transition of each transaction party by the verifier of the transaction party;
completing the confirmed transaction by asynchronously confirming the authorized state transition of each transferor and thus resulting in the transferring the control of the transfer asset to the transferee;
broadcasting the confirmed transaction to the distributed transaction network; and
updating the asynchronous distributed transaction map by the plurality of nodes, adding a new vertex representing the confirmed transaction to the asynchronous directed acyclic transaction map so that the confirmed transaction points to each predecessor transaction of its transaction parties.

2. The method as described in claim 1, wherein the step of initiating a new pending transaction further comprises locally proposing the pending transaction by the transaction parties through listing of the transaction parameters and each transaction party signing the transaction and sending to the verifier of each transaction party.

3. The method as described in claim 2, wherein the step of initiating the pending transaction is followed by the step of:
authenticating the pending transaction by each transaction party indicating its consent the pending transaction by digitally signing the transaction and sending it to the transaction party's verifier.

4. The method as described in claim 3, wherein:
the step of verifying the pending transaction by the verifier of each transaction party further comprises each verifier verifying that the state of the verifier's transaction party is sufficient to satisfy the transaction obligation and that no fork condition exists, whereby no fork condition exists when the predecessor transaction of the transaction party's verifier is pointed to by no successor transaction of the transaction party other than the pending transaction; and the step of designating the pending transaction as invalid further comprises designating the pending transaction as invalid by the verifier of one of the transaction parties upon the verifier determining that the state of its transaction party does not satisfy the transaction obligation or determining that a fork condition exists.

5. The method as described in claim 4, wherein:
the step of verifying the pending transaction further comprises each verifier digitally signing the pending transaction upon verifying that the state of the verifier's transaction party is sufficient to satisfy the transaction obligation and that no fork condition exists.

6. The method as described in claim 5, wherein:
the step of designating the pending transaction as confirmed transaction further comprises designating the pending transaction as a confirmed transaction only upon every verifier verifying and digitally signing the pending transaction, and authorizing the execution of the state transition of each transaction party by the verifier of the transaction party, in which the asset transfer as specified in the transaction results in the digital assets of each transaction party changes according to the transaction.

7. The method as described in claim 6, wherein:
the step of broadcasting the confirmed transaction to the distributed transaction network further comprises broadcasting the confirmed transaction to the distributed transaction network along with the digital signatures of each transaction party and the verifier of each transaction party.

8. The method as described in claim 7, wherein:
the step of amending the asynchronous directed acyclic transaction map further comprises adding the transaction to the map, with the transaction parameter pointing to all its predecessor transactions, and other nodes receiving the broadcasted transaction and all signatures of its transaction parties and verifiers optionally adding the transaction to its own copy of the asynchronous directed acyclic transaction map.

9. The method described in claim 8, wherein the step of verifying and confirming the transaction is accompanied by each verifier in the transaction collecting a transaction fee from its transaction party, and at the same time staking a portion of its digital assets as a stake.

10. The method as described in claim 9, wherein the step of updating the asynchronous distributed acyclic transaction network is followed by the steps of:
performing a post-confirmation monitoring of the confirmed transaction by at least one of the plurality of nodes, called a monitor node, which performs the post-confirmation monitoring function by verifying the validity of the confirmed transaction by ensuring that the state of each transferor in the transaction has sufficient digital assets to fulfill its transfer obligation in the confirmed transaction and that no fork condition exists; and
designating the confirmed transaction as an invalid transaction upon the node performing the post-confirmation monitoring function determining that the the transferor's state does not have sufficient digital assets to fulfill the obligation to transfer to the transferee in the transaction or that the fork condition exists, and broadcasting an invalid transaction objection by said monitor node to all the nodes of the distributed transaction network and identifying the invalid transaction and each verifier which improperly signed the invalid transaction for its client transaction party.

11. The method as described in claim 10, wherein the step of designating the confirmed transaction as an invalid transaction is followed by the steps of:
performing a reversal of the invalid transaction by the plurality of nodes using the global consensus mechanism and reversing each transaction state transition of the invalid transaction; and
discarding the invalid transaction from the asynchronous distributed acyclic transaction map.

12. The method as described in claim 11, wherein the step of performing a reversal of the invalid transaction is followed by the step of designating the verifier which has improperly signed the invalid transaction as a failing verifier, removing the failing verifier as the verifier of its transaction party by the plurality of nodes using the global consensus mechanism, and randomly selecting one of the plurality of verifier nodes to become the new verifier of the node of said transaction party via using the global consensus mechanism.

13. The method as described in claim 12, wherein:
the step of assigning a new verifier to each node by the global consensus system further comprises
the step of designating the verifier which has improperly signed the invalid transaction as a failing verifier and it further comprises the step of confiscating the stake of the failing verifier and redistributing the stake by the verifier nodes using the global consensus mechanism.

14. The method as described in claim 13, wherein the step of designating each verifier which has improperly signed the invalid transaction as a failing verifier further comprises the step of redistributing the stake as a reward to the monitor node which broadcast the invalid transaction objection and the nodes contributing to the global consensus mechanism, such as the mining nodes in a blockchain.

15. The method as described in claim 14 wherein:
the step of designating the confirmed transaction as an invalid transaction is followed by the step of:
broadcasting an unresponsive verifier objection to the distributed transaction network upon one of the transaction parties determining that its verifier has been unresponsive after the expiration of a designated period of time; and
the step of designating the verifier as an unresponsive verifier is followed by the step of:
removing the unresponsive verifier as the verifier of its transaction party by the global consensus mechanism, and randomly selecting one of the plurality of verifier nodes to become the new verifier of the node of said transaction party via using the global consensus mechanism.

16. The method as described in claim 15, wherein the step of assigning a verifier to each node by the plurality of nodes further comprises assigning a verifier to each node by the global consensus system as soon as each node joins the distributed transaction network.

17. The method as described in claim 16, wherein:
the global consensus system comprises of a blockchain comprising a plurality of sequential blocks, the plurality of nodes further include a plurality of mining nodes utilized to maintain the blockchain and mine successive new blocks, the global consensus mechanism allowing the nodes to agree on and carry out an operation representing the steps taken in claims 11-16 to be stored within each successive new block by the mining nodes; and
the step of performing a reversal of the invalid transaction is preceded by the step of receiving the invalid transaction objection or unresponsive verifier objection from the broadcast objection by the plurality of monitor nodes, mining a new block by one of the mining nodes whereby the new block contains a plurality of corrective actions appropriate for responding to the invalid transaction objection or the unresponsive verifier objection, incorporating the new block into the blockchain, and employing the global consensus mechanism amongst the plurality of nodes to allow the plurality of nodes to carry out the corrective actions stored within the new block, whereby the corrective actions comprise distributed computing operations for reversing the invalid transaction, removing and replacing the unresponsive verifier or the verifier which improperly signed the invalid transaction, and confiscating and redistributing the stake of the verifier which improperly signed the valid transaction.

18. The method as described in claim 17, wherein:

the distributed transaction network further has a unique cryptocurrency native to the distributed transaction network, whereby the digital assets of each node can contain among other types of digital assets, an amount of the unique cryptocurrency; and the steps as recited further comprise the step of:

rewarding the mining node which mines each successive new block with a pre-specified amount of the unique cryptocurrency.

19. The method as described in claim 18, wherein the step of designating each verifier which has improperly signed the invalid transaction as a failing verifier further comprises using the global consensus mechanism to initiate a new redistribution transaction whereby the transferor is the failing verifier, the transferee are the node which broadcast the invalid transaction, the nodes that contribute to maintaining the global consensus mechanism, such as the mining nodes in the blockchain, and the transfer asset is the stake of the failing verifier.

* * * * *